United States Patent
Avaldi et al.

(10) Patent No.: US 11,555,483 B2
(45) Date of Patent: Jan. 17, 2023

(54) ACCESS ARRANGEMENT FOR A WIND TURBINE BLADE

(71) Applicant: BLADE DYNAMICS LIMITED, Hampshire (GB)

(72) Inventors: Andrea Avaldi, Hampshire (GB); Chris Paul Swatton, Hampshire (GB); Harry George James Fish, Hampshire (GB); Jelmer Cnossen, Hampshire (GB); Manish Mukherjee, Hampshire (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 0 days.

(21) Appl. No.: 17/289,170

(22) PCT Filed: Oct. 25, 2019

(86) PCT No.: PCT/EP2019/079163
§ 371 (c)(1),
(2) Date: Apr. 27, 2021

(87) PCT Pub. No.: WO2020/089064
PCT Pub. Date: May 7, 2020

(65) Prior Publication Data
US 2021/0396215 A1    Dec. 23, 2021

(30) Foreign Application Priority Data

Oct. 29, 2018   (GB) ..................... 1817614

(51) Int. Cl.
*F03D 80/50*    (2016.01)
*F03D 1/06*    (2006.01)

(52) U.S. Cl.
CPC .......... *F03D 80/50* (2016.05); *F03D 1/0675* (2013.01); *F05B 2240/302* (2013.01);
(Continued)

(58) Field of Classification Search
CPC ...... F03D 1/0633; F03D 1/0675; F03D 80/50; F05B 2230/80; F05B 2240/305; F05B 2240/302
See application file for complete search history.

(56) References Cited

U.S. PATENT DOCUMENTS 9,388,791 B2 *  7/2016  Brooks .................. F03D 7/022
10,502,181 B2 * 12/2019  Danielsen ............ F03D 1/0675
(Continued)

FOREIGN PATENT DOCUMENTS

EP    1950414 A2    7/2008
EP    2385726 A1    11/2011
(Continued)

OTHER PUBLICATIONS

Search Report dated Aug. 29, 2019 in corresponding Great Britain Application No. GB1817614.9.
(Continued)

*Primary Examiner* — Courtney D Heinle
*Assistant Examiner* — Sang K Kim
(74) *Attorney, Agent, or Firm* — Nath, Goldberg & Meyer; Jerald L. Meyer; Tanya E. Harkins (57) ABSTRACT

The present invention relates to an access arrangement (90) of a wind turbine blade for accessing a hollow space within the blade. The access arrangement (90) comprises an access opening (180) provided in the blade shell member, a cover panel (92) for covering the access opening (180), a sealing member (96) arranged between the cover panel (92) and the blade shell member, and one or more fasteners (98) for releasably fastening the cover panel (92) to the blade shell member. The present invention also relates to a wind turbine blade comprising the access arrangement (90).

14 Claims, 7 Drawing Sheets

(52) U.S. Cl.
CPC ....... *F05B 2240/57* (2013.01); *F05B 2260/30* (2013.01); *F05B 2280/6003* (2013.01)

(56) References Cited

U.S. PATENT DOCUMENTS

| | | | |
|---|---|---|---|
| 2008/0240925 A1* | 10/2008 | Kita | F03D 1/0675 416/230 |
| 2011/0142667 A1 | 6/2011 | Miebach et al. | |
| 2012/0243989 A1* | 9/2012 | Mayda | F03D 17/00 416/1 |
| 2014/0199170 A1* | 7/2014 | Madsen | B23P 15/04 416/95 |
| 2015/0132137 A1* | 5/2015 | Humblot | F03D 1/0683 416/212 R |
| 2015/0167473 A1 | 6/2015 | Olson | |
| 2015/0369211 A1* | 12/2015 | Merzhaeuser | F03D 80/30 416/61 |
| 2015/0377217 A1* | 12/2015 | Sandercock | B29C 70/72 416/230 |

FOREIGN PATENT DOCUMENTS

| | | |
|---|---|---|
| EP | 2746573 A2 | 6/2014 |
| ES | 2385726 A1 | 7/2012 |
| WO | 2009/135902 A2 | 11/2009 |
| WO | 2010/046288 A2 | 4/2010 |
| WO | 2011/067323 A2 | 6/2011 |
| WO | 2012/167891 A1 | 12/2012 |
| WO | 2017/071717 A1 | 5/2017 |

OTHER PUBLICATIONS

International Search Report dated Jan. 22, 2020 issued in corresponding International Application No. PCT/EP2019/079163.

* cited by examiner

ACCESS ARRANGEMENT FOR A WIND TURBINE BLADE

This is a National Phase Application filed under 35 U.S.C. 371 as a national stage of PCT/EP2019/079163, filed Oct. 25, 2019, an application claiming the benefit of United Kingdom Application No. 1817614.9, filed Oct. 29, 2018, the content of each of which is hereby incorporated by reference in its entirety.

FIELD OF THE INVENTION

The present invention relates to an access arrangement of a wind turbine blade, to a method of manufacturing the access arrangement, and to a wind turbine blade comprising the access arrangement.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbines increases, the manufacturing and transporting of wind turbine blades becomes more challenging and costly. To address this, it is known to provide a wind turbine blade in two or more segments. This may result in an easier manufacturing process and may reduce the cost of transportation and erection of wind turbines. The blade segments may be transported to the erection site where they can be assembled to form the wind turbine blade.

However, several challenges are associated with such design, relating to the manufacturing and joining of the shell segments including load bearing structures such as spar beams, shear webs or other internal components. As internal parts of a wind turbine blade may have to be connected or disconnected as part of such processes, a suitable access arrangement needs to be provided to access such internal parts from the outside of the blade.

WO 2011/067323 A2 discloses a sectional blade for a wind turbine, the blade comprising a first and a second blade section extending in opposite directions from a blade joint and being structurally connected by a spar bridge. A receiving section holds the spar bridge via a bearing member, which comprises two bearing halves. The bearing halves are assembled by bolts and connected to a spar section. The bolts may be tightened through openings in the blade shells, which may be filled afterwards to provide a smooth outer surface of the blade.

WO 2012/167891 A1 relates to a rotor blade of a wind turbine having an accessible cavity, wherein the rotor blade shell has a closable opening with a hatch closing flush with the outer layer of the rotor blade shell. The opening is designed for rescuing maintenance workers in the event of an accident or emergency. The hatch is permanently attached to the shell with a hinge for opening the hatch with an inwardly or outwardly directed pivot movement.

These and other known methods of providing access suffer from a number of drawbacks including insufficient sealing and the resulting ingress of moisture or debris, as well as negative impacts on aerodynamic properties and/or structural stability of the blade. There is consequently a need in the art for providing an improved access solution for wind turbine blades.

It is therefore an object of the present invention to provide a wind turbine blade with an improved access opening arrangement.

Particularly, it is an object of the present invention to provide an access opening arrangement for a wind turbine blade or related structures that is easy to manufacture and to assemble.

It is another object of the present invention to provide an access opening arrangement for a wind turbine blade or related structures that has minimal impact on blade performance, such as aerodynamic properties

SUMMARY OF THE INVENTION

It has been found that one or more of the aforementioned objects can be obtained by an access arrangement of a wind turbine blade for accessing a hollow space within the blade, the hollow space being at least in part defined by a blade shell member, the access arrangement comprising
   an access opening provided in the blade shell member,
   a cover panel for covering the access opening,
   a sealing member arranged between the cover panel and the blade shell member, and
   one or more fasteners for releasably fastening the cover panel to the blade shell member.

The access arrangement of the present invention allows for installation of a chordwise locking pin for releasably coupling a first part to a second part of a spar structure. The access arrangement may also be used to access internal parts within a wind turbine blade such as connections of a blade lightning protection system or for general maintenance operations. It was found that the access arrangement of the present invention minimizes or completely avoids negative impacts on the aerodynamic performance and structural integrity of the wind turbine blade, while efficiently preventing influx and efflux of liquid or debris The hollow space within the blade will typically be an inner volume of a wind turbine blade as defined at least by a pressure side shell half and a suction side shell half. Thus, the blade shell member may be a pressure side shell half or a suction side shell half, or a segment thereof, such as a tip end segment or a root end segment of a segmented wind turbine blade.

The access opening will typically be a rectangular cut-out within the blade surface, preferably a rectangular cut-out with rounded corners. The access opening may be cut out or drilled through the shell member using a drill jig. Similarly, the cover panel for covering the access opening will typically have a rectangular shape, preferably with rounded corners. The cover panel will usually comprise an outer surface and an opposing inner surface which faces the interior of the wind turbine blade when the cover panel is arranged and fixed over the access opening. The outer surface of the cover panel will typically be a curved surface, which preferably has the same curvature as the outer surface of the shell member at that location of the blade.

The sealing member arranged between the cover panel and the blade shell member will typically be a gasket, preferably an annular gasket which has substantially the same shape as the outer circumference of the cover panel. The sealing member may be adhesively fastened or bonded to the inner surface of the cover panel. Preferably, a plurality of fasteners is used for releasably fastening the cover panel to the blade shell member, such as two or more, five or more, most preferably ten or more fasteners.

In a preferred embodiment, the access arrangement comprises a retaining member connecting the cover panel and the blade shell member independently of the one or more fasteners. The retaining member preferably comprises a pad eye, such as a soft pad eye, attached to the cover panel, preferably an inner surface thereof. The retaining member may further comprise a chord or strap attached to the pad eye at one end and attached to the inside of the wind turbine blade at another end. The retaining member helps to secure the cover panel to the blade when the cover panel is opened at height, for example during maintenance or other operations in which access to the inside of the blade is necessary.

According to one embodiment, the one or more fasteners are single-sided fasteners, preferably rivets. This results in an easy and efficient fastening method, which is safe and cost-effective. In a preferred embodiment, the one or more fasteners are screw rivets. Screw rivets may be made of a polymer material such as nylon, and may comprise two separate parts which can be assembled. In other embodiments, the one or more fasteners comprise rivet screws, such as rivet screws which can be screwed into the threaded sleeve of a rivet tool, wherein the rivet sleeve can be inserted into a hole. Rivet screws may be used in combination with one or more additional screwed components for releasably fastening the cover panel to the blade shell member.

In a preferred embodiment, the one or more fasteners comprise a dielectric material. Preferably the one or more fasteners consist of one or more dielectric material. This is particularly advantageous when the access arrangement is part of a lightning protection system of a wind turbined blade. In some embodiments, the dielectric material is a polymer, preferably a polyamide, preferably nylon, most preferred Nylon 6. It is thus preferred that the one or more fasteners are non-metallic fasteners.

In a preferred embodiment, each fastener is releasably inserted in aligned respective holes provided in the cover panel, sealing member and blade shell member. In some embodiments, each of the cover panel, sealing member and blade shell member comprises at least ten holes for receiving fasteners therein.

In another embodiment, the holes provided in the cover panel are arranged annularly along an outer circumference of the cover panel. Thus, each hole may be located not further than 50 mm, such as not further than 30 mm, from an outer edge of the cover panel.

In a preferred embodiment, the aligned respective holes provided in the cover panel, sealing member and blade shell member are arranged such that the cover panel can be releasably fastened to the blade shell member in a single spatial orientation only. Thus, it can be prevented that the cover panel is attached to the blade shell member in a wrong orientation.

According to one embodiment, the arrangement includes a plurality of fasteners, preferably 10-50 fasteners, such as 10-30 fasteners. In some embodiments, the blade shell member has an outer surface, the outer surface of the blade shell member comprising an annular indentation surrounding the access opening for receiving the sealing member and the cover panel. Such annular indentation is helpful in obtaining a flush surface of the cover panel and the surrounding outer blade surface. In a preferred embodiment, the annular indentation has a chamfered edge for providing a smooth transition.

It is preferred that the holes provided in the blade shell member are arranged annularly along the annular indentation of the outer surface of the blade shell member, the holes surrounding the access opening. Typically, the blade shell member has a curved outer surface. Thus, in a preferred embodiment, the cover panel has a curved outer surface.

In a preferred embodiment, the sealing member is an annular gasket, preferably comprising an ethylene propylene diene monomer (EPDM) material, such as a EPDM sponge rubber or EPDM foam. In some embodiments, the access opening has a height of 450-650 mm, such as 500-600 mm, and a width of 350-550 mm, such as 400-500 mm. In a preferred embodiment, the access opening covers an area of not more than 0.25 $m^2$, such as not more than 0.2 $m^2$. It was found that such comparatively small openings lead to minimal aerodynamic disturbance yet allowing the servicing of internal parts such as locking pin arrangements and connections of a lightning protection system.

In another embodiment, the access opening arrangement further comprises a self-adhesive layer provided between the cover panel and the sealing member. According to one embodiment, the cover panel is substantially made of the same material as the blade shell member.

An annular lip may be attached along the outer circumference of the cover panel. This annular lip is preferably made of a soft and/or elastic material to provide a smooth transition to the surrounding shell part.

In some embodiments, the cover panel comprises a thermoplastic material, such as a thermoplastic polyurethane. In other embodiments, the blade comprises a pre-fabricated ring integrated into the blade shell or attached at the inner surface thereof. Such pre-fabricated ring could be used for attachment of the fasteners.

According to one embodiment, the access opening allows for access for inserting and/or withdrawing a chordwise locking pin.

It is preferred that the outer surface of the blade shell member is flush with the outer surface of the cover panel when the cover panel is fastened to the blade shell member.

In another aspect, the present invention relates to a wind turbine blade having a profiled contour including a pressure side and a suction side, and a leading edge and a trailing edge with a chord having a chord length extending therebetween, the wind turbine blade extending in a spanwise direction between a root end and a tip end, wherein the blade comprises a shell body with at least one pressure side shell member and at least one suction side shell member, and wherein the pressure side shell member or the suction side shell member comprises an access opening provided in the blade shell member,
  a cover panel for covering the access opening,
  a sealing member arranged between the cover panel and the blade shell member, and
  one or more fasteners for releasably fastening the cover panel to the blade shell member.

In other words, the present invention relates to a wind turbine blade comprising an access arrangement as described above. The wind turbine blade may comprise any features or embodiment described above in relation to the access arrangement.

In particular, the wind turbine blade of the present invention may comprise at least one locking pin for releasably locking spar elements to each other. The wind turbine blade of the present invention may also comprise a retaining member connecting the cover panel and the blade shell member independently of the one or more fasteners. Also, the one or more fasteners are preferably single-sided fasteners and/or preferably comprise a dielectric material. The wind turbine blade of the present invention may comprise a blade shell member with an outer surface, the outer surface of the blade shell member comprising an annular indentation surrounding the access opening for receiving the sealing member and the cover panel.

The wind turbine blade of the present invention preferably comprises two or more segments, such as a tip end segment and a root end segment, each segment comprising a pressure side shell member and a suction side shell member. Typically, the wind turbine blade comprises one or more shear webs or spar beams.

In another aspect, the present invention relates to an access arrangement for accessing a hollow space, the hollow space being at least in part defined by a separation member, the access arrangement comprising

- an access opening provided in the separation member,
- a cover panel for covering the access opening,
- a sealing member arranged between the cover panel and the separation member, and
- one or more fasteners for releasably fastening the cover panel to the separation member.

It is particularly preferred that the separation member is a shell of a wind turbine blade, or a part thereof. The access arrangement for accessing a hollow space may comprise any feature or embodiment described above in relation to the access arrangement of a wind turbine blade for accessing a hollow space within the blade.

In another aspect, the present invention relates to a method of manufacturing an access arrangement according to the present invention, comprising the steps of

- arranging an implant in a mould for moulding a wind turbine blade shell part,
- arranging a fibre material on said mould and the implant,
- infusing the fibre material and implant with a resin,
- curing the resin to produce a hardened blade shell part,
- removing the implant from the hardened blade shell part to expose an indentation on the surface of the shell part at the location of the implant, and
- drilling or cutting a hole through the shell part at the location of the indentation to produce an access opening.

Preferably, the fibre material comprises glass fibres. In some embodiments, the fibre material comprises carbon fibres or glass and carbon fibres. The implant may advantageously have a rectangular shape with rounded corners. The implant may also have chamfered edges to provide a smooth transition from the outer blade surface to the indentation or the access opening. The access opening preferably has a smaller size than the indentation made by the implant.

In yet another aspect, the present invention relates to a method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising the steps of:

- a1) manufacturing a pressure side shell half and a suction side shell half over substantially the entire length of the wind turbine blade,
- b1) arranging a spar structure within one of the shell halves, the spar structure comprising a first part and a second part, the first and second part being releasably coupled to each other,
- c1) closing and joining the shell halves for obtaining a closed shell,
- d1) cutting the closed shell along a cutting plane substantially normal to the spanwise direction of the closed shell to obtain a first and a second blade segment, each blade segment comprising part of the pressure side shell half and part of the suction side shell half, wherein the spar structure extends across the cutting plane,
- e1) uncoupling the first and second part of the spar structure,
- f1) separating the first blade segment from the second blade segment,
- g1) joining and sealing the first blade segment to the second blade segment for obtaining the wind turbine blade, wherein the spar structure comprises at least one locking pin for releasably coupling the first part to the second part of the spar structure through aligned respective locking apertures in each of the first and second part of the spar structure, and wherein the wind turbine blade comprises an access arrangement according to the present invention. Thus, the locking pin may be inserted into, or withdrawn from, the aligned respective locking apertures in each of the first and second part of the spar structure by accessing the interior or the blade through the access opening of the access arrangement of the present invention.

Preferably, step e1) comprises withdrawing the locking pin from the aligned respective apertures in each of the first and second part of the spar structure via the access arrangement. In some embodiments, the method further comprises a step f2) or h1) of re-inserting the locking pin into the aligned respective apertures in each of the first and second part of the spar structure via the access arrangement.

By manufacturing the wind turbine blade using a spar structure comprising a first part and a second part, releasably coupled to each other, an efficient and elegant method is provided for segmenting and re-assembling such wind turbine blade, including uncoupling and preferably re-coupling said parts.

Preferably, the pressure side shell half and the suction side shell half are manufactured over the entire length of the wind turbine blade, i.e. over their entire final length. The pressure side shell half and the suction side shell half will typically be adhered or bonded to each other near the leading edge and near the trailing edge. Each shell half may comprise longitudinally/spanwise extending load carrying structures, such as one or more main laminates or spar caps, preferably comprising reinforcement fibres such as glass fibres, carbon fibres, aramid fibres, metallic fibres, such as steel fibres, or plant fibres, or mixtures thereof. The shell halves will typically be produced by infusing a fibre lay-up of fibre material with a resin such as epoxy, polyester or vinyl ester.

Usually, the pressure side shell half and the suction side shell half are manufactured using mould structures. In some embodiments, the shell halves remain in the mould structure during steps a1, b1, and c1. Each of the shell halves may comprise spar caps or main laminates provided along the respective pressure and suction side shell members. The spar caps or main laminates may be affixed to the inner faces of the shell halves. The spar structure is preferably a longitudinally extending load carrying structure, preferably comprising a beam or spar box for connecting and stabilizing the shell halves. The spar structure may be adapted to carry a substantial part of the load on the blade.

In some embodiments, the spar structure is arranged within the pressure side shell half in step b1). In other embodiments, the spar structure is arranged within the suction side shell half in step b1). The spar structure comprises a first part and a second part, the first and second part being releasably coupled to each other, such as releasably fixed or locked to each other. In some embodiments, the first and second part are releasably coupled to each other by one or more mechanical devices. In some embodiments, the first and second part are releasably coupled to each other by a mechanical locking mechanism. The second part of the spar structure may advantageously comprise a spar beam or a spar box. The first part of the spar structure may preferably comprise an arrangement for receiving the second part, such as a hollow member or a sheath.

The joining step in c1) may be carried out using any suitable joining mechanism or process, including adhesives, bonding material, mechanical fasteners, and any combination of the same. The closed shell obtained in c1) is preferably a full-length preform of the final wind turbine blade obtainable by the method of the present invention.

In step d1) the closed shell is cut along a cutting plane substantially normal to the spanwise direction or longitudinal axis of the closed shell. In other words, the spanwise direction or longitudinal axis of the closed shell is substantially normal to said cutting plane. It is preferred that only the shell body is cut along the cutting plane. It is also preferred that the spar structure is not cut in step d1.

In some embodiments, the first blade segment constitutes 30-80%, such as 40-70%, of the entire longitudinal extent of the blade. In some embodiments, the second blade segment constitutes 10-50%, such as 20-40%, of the entire longitudinal extent of the blade. Advantageously, the spar structure extends across the cutting plane, preferably without being cut. The first and second blade segments may include respective ends with complimentary joint sections that are joinable at a chord-wise joint.

The step e1) of uncoupling the first and second part of the spar structure is preferably performed by unlocking a mechanical locking mechanism. After separating the first blade segment from the second blade segment in step f1), the individual blade segments may be individually transported, for example by respective trucks. The first blade segment and the second blade segment may be transported to an erection site for a wind turbine.

The step g1) of joining and sealing the first blade segment to the second blade segment for obtaining the wind turbine blade may advantageously be performed at the erection site of the wind turbine. This step may be carried out using any suitable joining and/or sealing mechanism or process, including adhesives, bonding material, mechanical fasteners, and any combination of the same.

In a preferred embodiment, the first part of the spar structure is fixed to the first blade segment. In some embodiments, the first part of the spar structure is glued or adhered to the first blade segment, preferably to both the partial suction side shell half and the partial pressure side shell half. In a preferred embodiment, the first part of the spar structure does not extend beyond the first blade segment.

According to some embodiments, the second part of the spar structure is fixed, such as glued or adhered, to the second blade segment, preferably to both partial shell halves. The second part of the spar structure preferably extends beyond the second blade segment into the first blade segment. Thus, the second part of the spar structure preferably protrudes from within the second part of the spar structure.

In a preferred embodiment, the first blade segment comprises the root end of the blade. In another preferred embodiment, the second blade segment comprises the tip end of the blade. The blade may be also cut into more than two segments.

In some embodiments, the second part of the spar structure comprises a spar member, such as a spar beam or a spar box, the spar box preferably comprising at least one spar beam and at least one spar flange. In some embodiments, the first part of the spar structure comprises a receiving member, preferably a sheath member, for at least partly receiving or enclosing the second part of the spar structure. In some embodiments, the second part of the spar structure comprises a spar member, which is at least partly received or enclosed in a receiving structure. The receiving structure can be a jacket, for example a jacket comprising a mesh or net-like structure. In some embodiments, the jacket is made of the same material as the sheath member of the first part of the spar structure. It is preferred that the jacket is a conductive jacket.

According to some embodiments, the sheath member is substantially box-shaped. In other embodiments the sheath member is hollow. In other embodiments, the sheath member comprises a mesh or a net-structure. In a preferred embodiment, the sheath member is a conductive sheath member.

In a preferred embodiment, the conductive sheath member is part of a lightning protection system of the wind turbine blade. In a preferred embodiment the conductive sheath member of the first part and the conductive jacket of the second part are both part of a lightning protections system of a wind turbine blade.

According to some embodiments, step b1) comprises fixing the first part of the spar structure to one or both of the shell halves within the first blade segment obtained in step d1). Thus, step b1) may comprise fixing the first part of the spar structure to the partial suction side shell half and the partial pressure side shell half of the later obtained first blade segment, such as a root end blade segment.

In a preferred embodiment, step b1) comprises fixing the second part of the spar structure to one or both of the shell halves within the second blade segment obtained in step d1). Thus, step b1) may comprise fixing the second part of the spar structure to the partial suction side shell half and the partial pressure side shell half of the later obtained second blade segment, such as a tip end blade segment.

In a preferred embodiment, the spar structure comprises at least one locking pin for releasably coupling the first part to the second part of the spar structure through aligned respective locking apertures in each of the first and second part of the spar structure. In other embodiments, the spar structure comprises two or more, such as three or more, or four or more, locking pins and two or more, such as three or more, or four or more, respective locking apertures in each of the first and second part of the spar structure. Preferably, the locking apertures are respective through holes formed in the sheath member and the spar member, respectively.

In a preferred embodiment, step d1) does not comprise cutting the spar structure. According to some embodiments, the cutting plane of step d1) is located within a spanwise region of 0.5 L-0.8 L as seen from the root end, wherein L is the total length or longitudinal extent of the wind turbine blade between its root end and its tip end.

In a preferred embodiment, the cutting plane of step d1) coincides with an end surface of the first part of the spar structure. It is preferred that the cutting plane of step d1) extends across the second part of the spar structure. According to some embodiments, step g1) is carried out using a sealing member positioned between the first and second blade segments, wherein the sealing member is configured to allow relative movement between the first and second blade segments.

In a preferred embodiment, the pressure side shell half and the suction side shell half are manufactured in respective mould halves, preferably by vacuum assisted resin transfer moulding. According to some embodiments, the pressure side shell half and the suction side shell half each have a longitudinal extent L of 50-90 m, preferably 60-80 m.

In a preferred embodiment, the pressure side shell half and the suction side shell half each comprise one or more layers of carbon fibres disposed within the first blade segment obtained in step d1). According to some embodiments, the method further comprises a step b2) of arranging one or more shear webs in at least one of the shell halves, preferably within the first blade segment obtained in step d1). Each shear web may comprise a web body, a first web foot flange at a first end of the web body, and a second web foot flange at a second end of the web body. In some embodiments, the shear webs are substantially I-shaped. Alternatively, the shear webs may be substantially C-shaped.

In a preferred embodiment, step f1) comprises transporting the separated first and second blade segments to a predetermined location. Typically, the predetermined location will be the site of erecting the wind turbine. Advantageously, the first blade segment can be transported independently from the second blade segment.

According to some embodiments, step g1) comprises joining and sealing the first blade segment to the second blade segment at said predetermined location.

The present invention also relates to a wind turbine blade obtainable by the method of manufacturing a wind turbine blade as described above. The present wind turbine blade can be easily and efficiently assembled due to its spar structure and its coupling and de-coupling properties.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

The invention is explained in detail below with reference to an embodiment shown in the drawings, in which.

DETAILED DESCRIPTION

Figure 1:
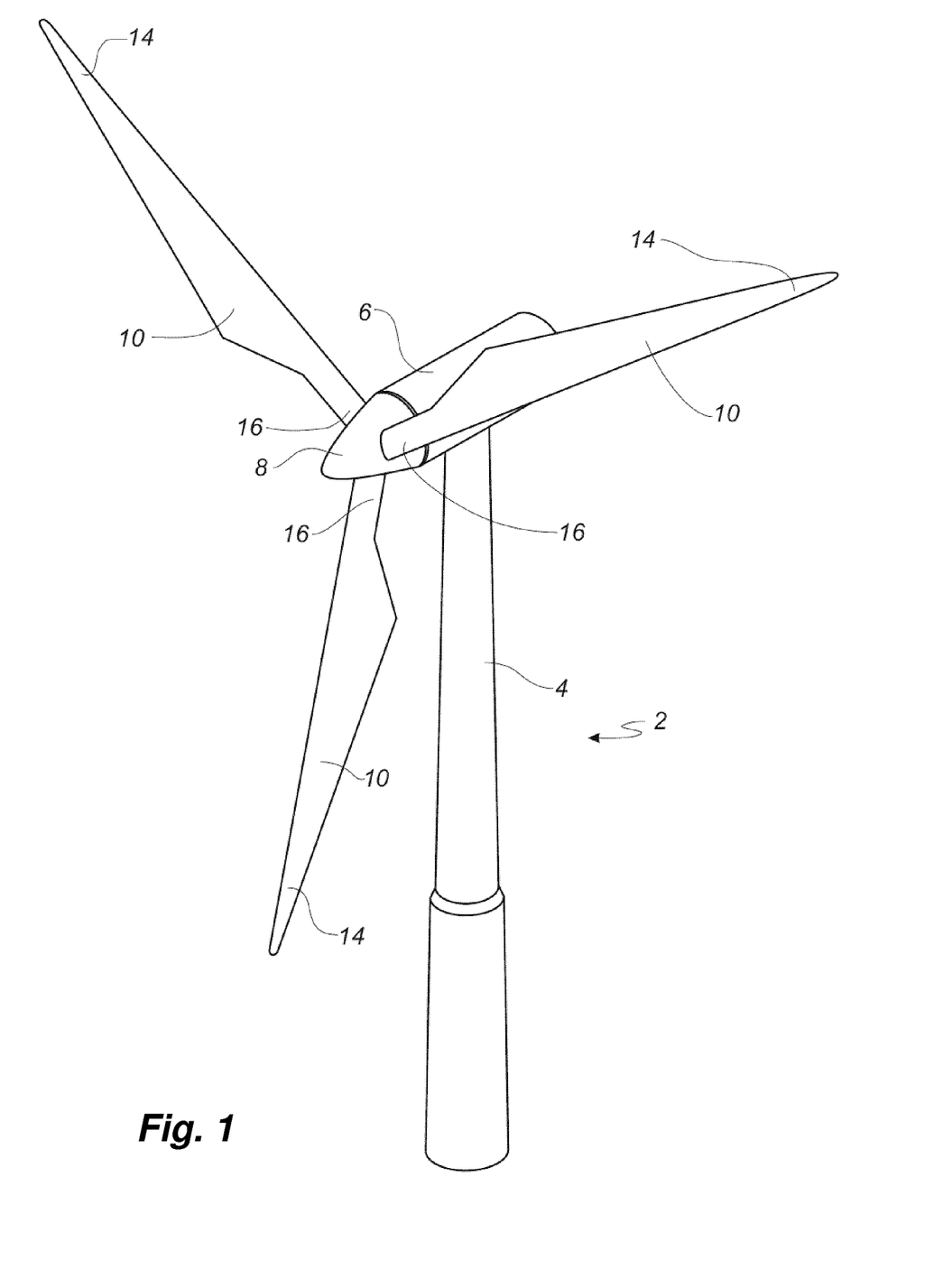
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
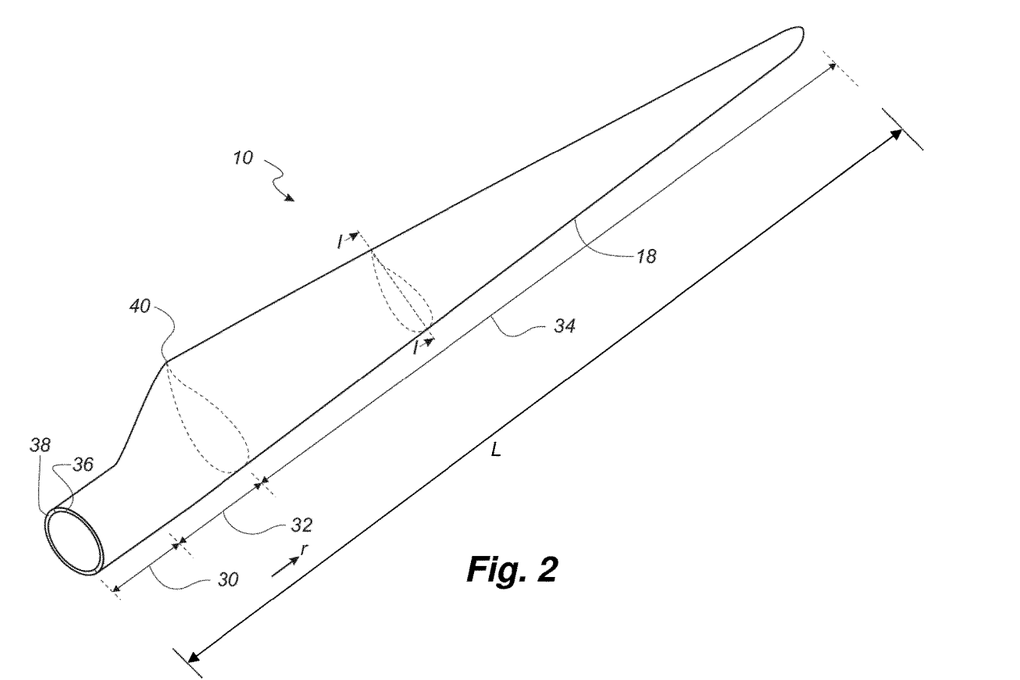
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
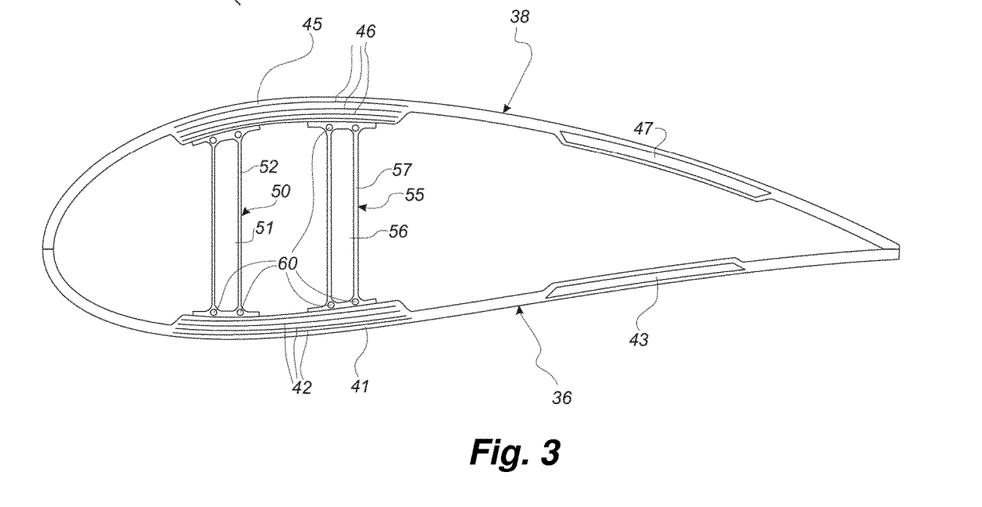
FIG. 3 shows a schematic view of a cross-section of a wind turbine blade.

FIG. 3 shows a schematic view of a cross section of the blade along the line 1-1 shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

Figures 4, 5:
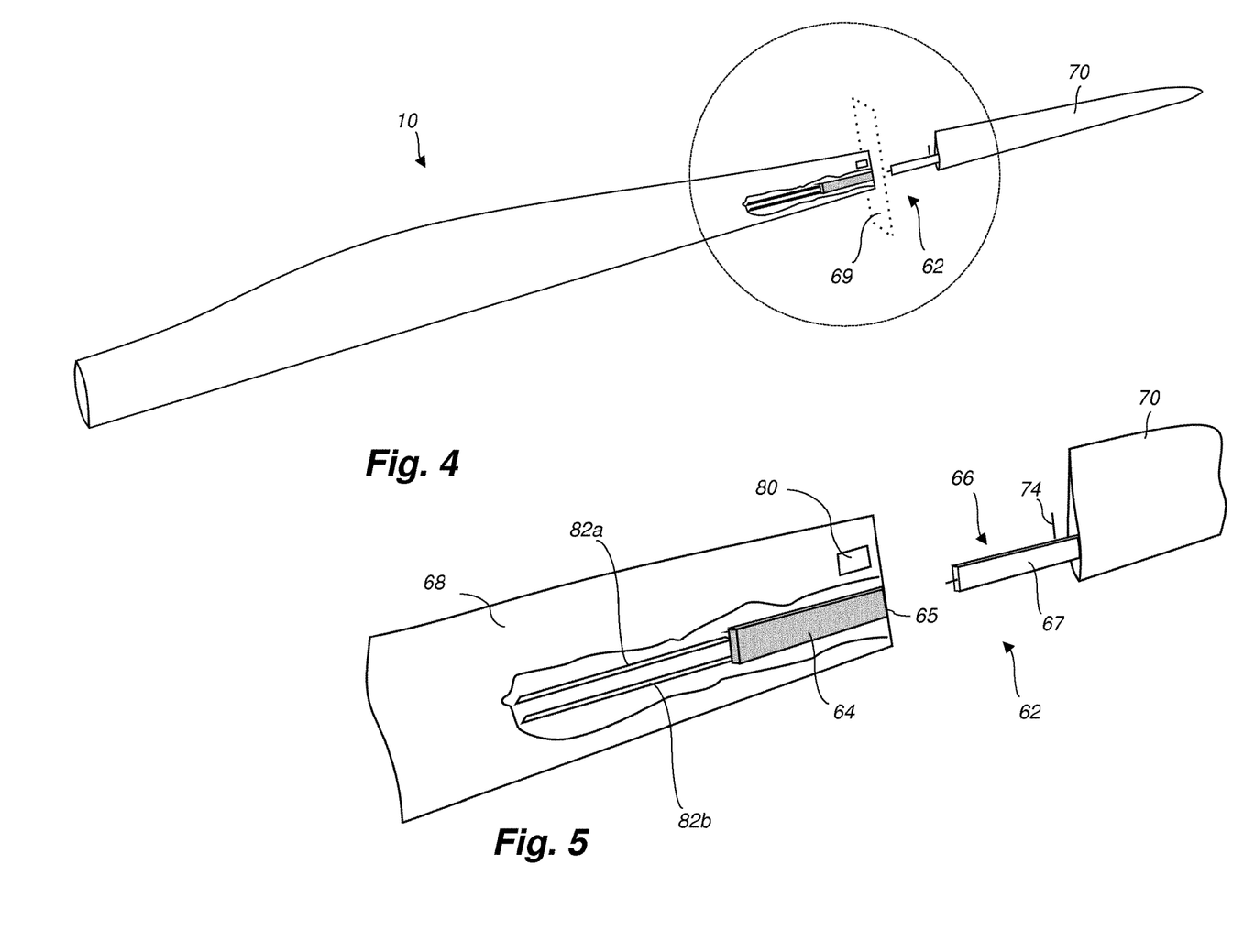
FIG. 4 is a schematic cut-open view of a wind turbine blade.
FIG. 5 is an enlarged view of the encircled section in FIG. 4, and FIGS. 6, 7 and 8 are perspective views of a spar structure.
Figures 7, 8:
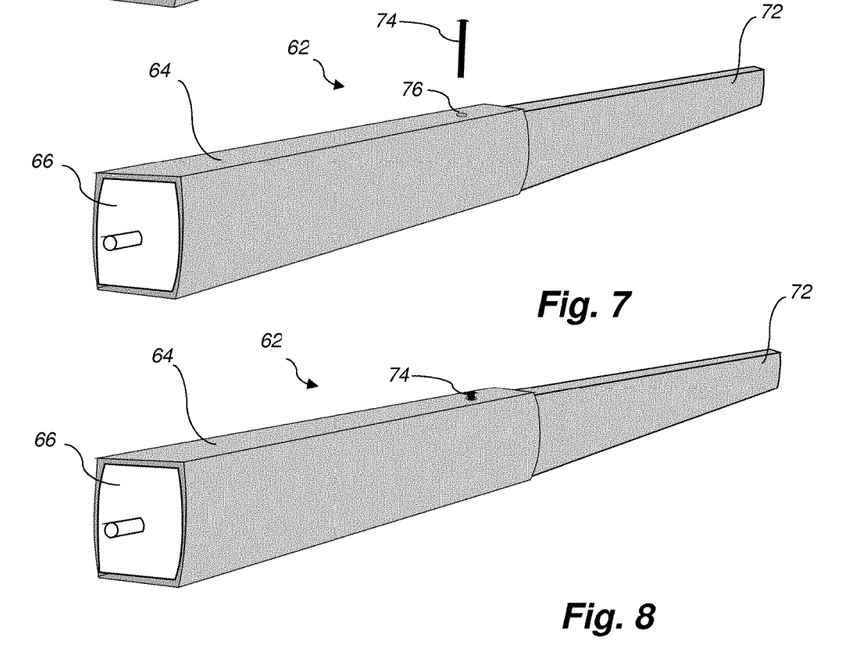

FIG. 4 is a schematic cut-open, exploded view of a wind turbine blade according to a co-pending application of the present applicant, wherein FIG. 5 is an enlarged view of the encircled section in FIG. 4. A pressure side shell half and a suction side shell half are typically manufactured over the entire length L of the wind turbine blade 10. A spar structure 62 is arranged within the shell. The spar structure 62 comprising a first part 64 and a second part 66, the first and second part being releasably coupled to each other, as shown in FIG. 8. The method advantageously comprises fixing the first part 64 of the spar structure 62 to one or both of the shell halves within the first blade segment 68 and fixing the second part 66 of the spar structure to one or both of the shell halves within the second blade segment 70.

The shell halves are then closed and joined, such as glued together for obtaining a closed shell, which is subsequently cut along a cutting plane 69 substantially normal to the spanwise direction or longitudinal extent of the blade to obtain a first blade segment 68 and a second blade segment 70. The cutting plane 69 coincides with an end surface 65 of the first part 64 of the spar structure.

As seen in FIGS. 4 and 5, the spar structure 62 extends across the cutting plane 69. As best seen in FIG. 5, the first part 64 of the spar structure 62, which takes the form of a box-shaped sheath member for at least partly enclosing the second part 66 of the spar structure in the illustrated embodiment, is fixed to the first blade segment 68. The second part 66 of the spar structure 62, which comprises a spar box in the illustrated embodiment, is fixed to the second blade segment 70, wherein the second part 66 extends beyond the second blade segment 70 into the first blade segment 68, when the blade segments are assembled.

Figure 6:
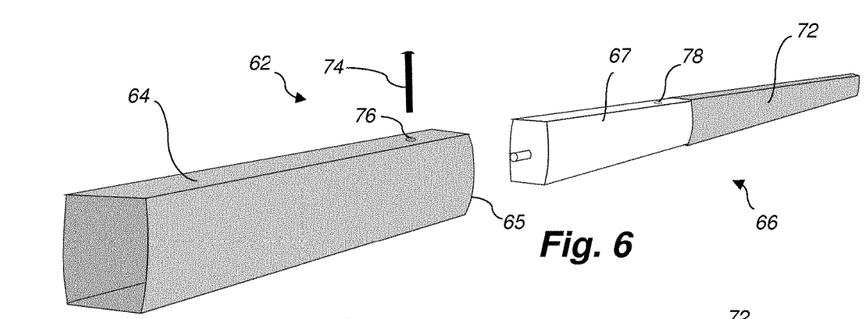

FIG. 5 also illustrates an access opening 80 within the upper half of the illustrated shell for accessing the spar structure and coupling and uncoupling the first and second part of the spar structure 62. For uncoupling, a locking pin, as illustrated in FIGS. 6-8, is withdrawn from the aligned respective apertures 76, 78 in each of the first and second part of the spar structure via the access opening 80. Prior to, or after, joining and sealing the first blade segment 68 to the second blade segment 70 for obtaining the wind turbine blade, the method advantageously comprises re-coupling the first and second part of the spar structure, via the access opening 80, as illustrated in FIG. 8, by re-inserting the locking pin 74 into the aligned respective apertures 76, 78 in each of the first and second part of the spar structure. As seen in FIGS. 4 and 5, the cutting step d1) does not comprise cutting the spar structure, only the shell halves are cut. In addition, two shear webs 82a, 82b are arranged within the first blade segment.

FIGS. 6, 7 and 8 illustrate an embodiment of the spar structure 62 with the first part 64 in the form of a conductive, box-shaped sheath member according to a co-pending application of the present applicant. Preferably, the conductive sheath member is part of a lightning protection system of the wind turbine blade. The second part 66 of the spar structure comprises a box spar 67, part of which is encased in a jacket 72, for example comprising a conductive mesh 72. The spar structure 62 comprises a locking pin 74 for releasably coupling the first part 64 to the second part 66 of the spar structure through aligned respective locking apertures 76, 78 in each of the first and second part of the spar structure.

Figure 9:
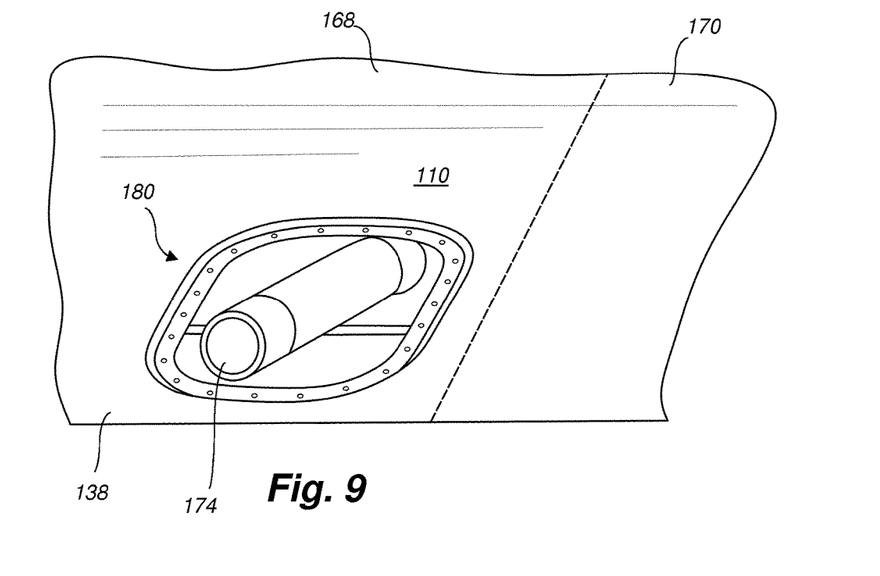
FIG. 9 is a partial perspective view of an access opening of a wind turbine blade according to the present invention.

FIG. 9 is a partial perspective view of an access opening 180 of a wind turbine blade according to the present invention. The wind turbine blade comprises a shell member 138, such as a suction side shell half, with an outer surface 110. The shell member 138 may comprise a first segment 168, such as a root end segment, connected to a second segment 170, such as a tip end segment. An access opening 180 is provided in the blade shell member 138 for allowing access to a hollow space within the blade, e.g. for inserting or withdrawing a locking pin 174 as described above.

Figure 10:
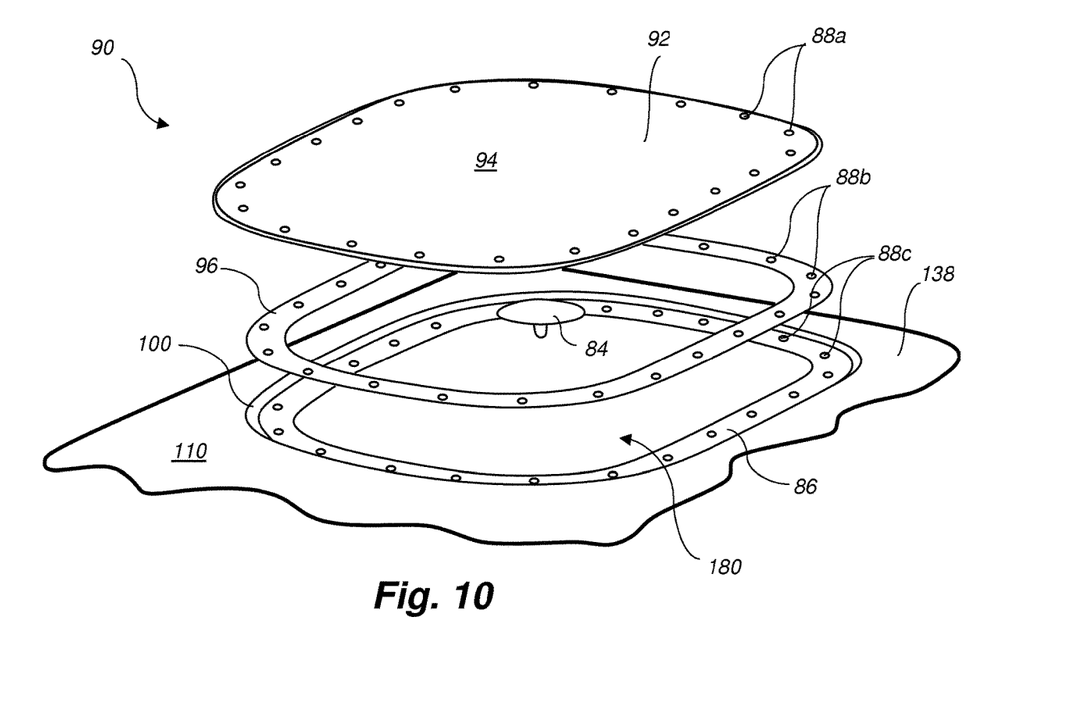
FIG. 10 is an exploded, partial perspective view of an access arrangement of a wind turbine blade according to the present invention.
Figure 11:
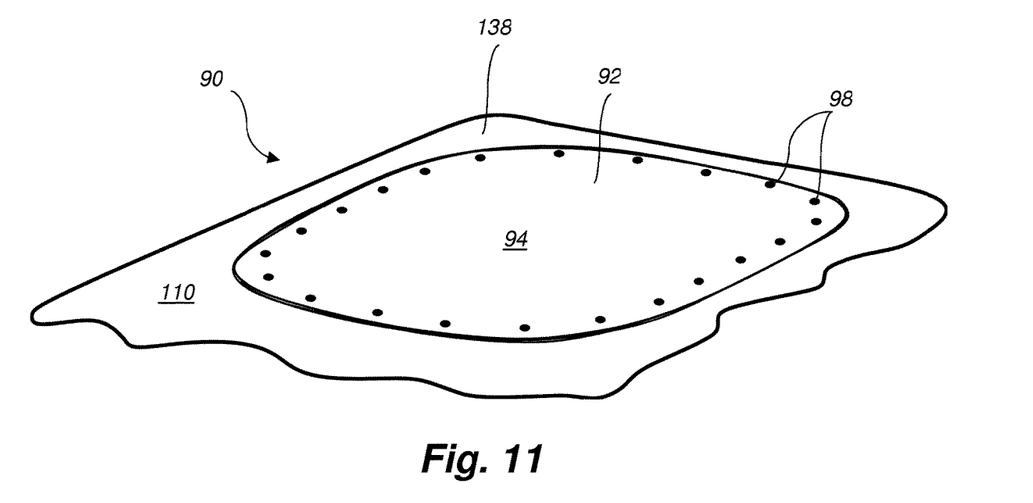
FIG. 11 is an assembled, partial perspective view of an access arrangement of a wind turbine blade according to the present invention.

FIGS. 10 and 11 illustrate an access arrangement 90 of a wind turbine blade according to the present invention in an exploded and assembled view, respectively. The access arrangement 90 comprises the access opening 180 provided in the blade shell member 138 and a cover panel 92 for covering the access opening 180. The outer surface 94 of the cover panel 92 is advantageously flush with the outer surface 110 of the cover panel 92 when the cover panel 92 is fastened to the blade shell member 138. Also, the cover panel 92 preferably has a curved outer surface 94 matching the curvature of the surrounding outer surface 110 of the blade shell member 138.

Figure 12:
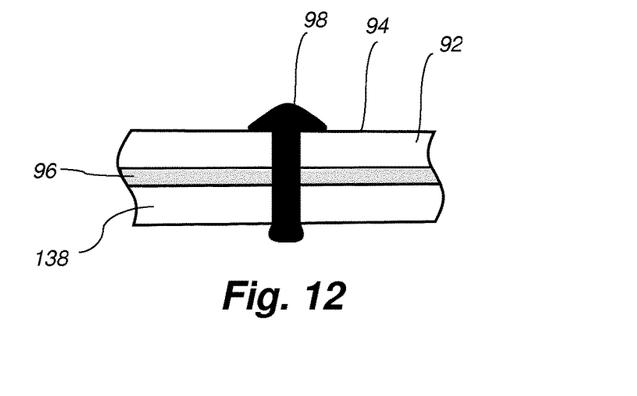
FIG. 12 is a cross-sectional view illustrating a fastener for releasably fastening a cover panel to a blade shell member according to the present invention.

The access arrangement 90 also comprises a sealing member 96 arranged between the cover panel 92 and the blade shell member 138. The sealing member 96 preferably takes the form of an annular gasket, as illustrated in FIG. 10. The access arrangement also comprises a plurality of fasteners 98 for releasably fastening the cover panel to the blade shell member, as illustrated in FIGS. 11 and 12. Each fastener is releasably inserted in aligned respective holes 88a,b,c provided in the cover panel 92, sealing member 96 and blade shell member 138. The holes 88a provided in the cover panel 92 are arranged annularly along an outer circumference of the cover panel 92.

As also seen in FIG. 10, the outer surface 110 of the blade shell member 138 comprises an annular indentation 86 surrounding the access opening 180 for receiving the sealing member 96. The annular indentation 86 has a chamfered edge 100 smoothly leading towards the surrounding blade surface 110. FIG. 10 also illustrates a pad eye 84 which is attached to the inner surface of the cover panel 92 for securing the access panel when it is opened during installation or maintenance at height.

FIG. 12 is a cross-sectional view illustrating a fastener 98 for releasably fastening a cover panel 92 to a blade shell member 138 according to the present invention. As described above, the fastener 98 is releasably inserted in aligned respective holes provided in the cover panel 92, sealing member 96 and blade shell member 138. The fastener 98 may be a blind rivet made from a polymer such as nylon, and having a head, a shank and a blind end. The rivet 98 may be supplied with a mandrel for expanding the blind end of the rivet.

Figure 13:
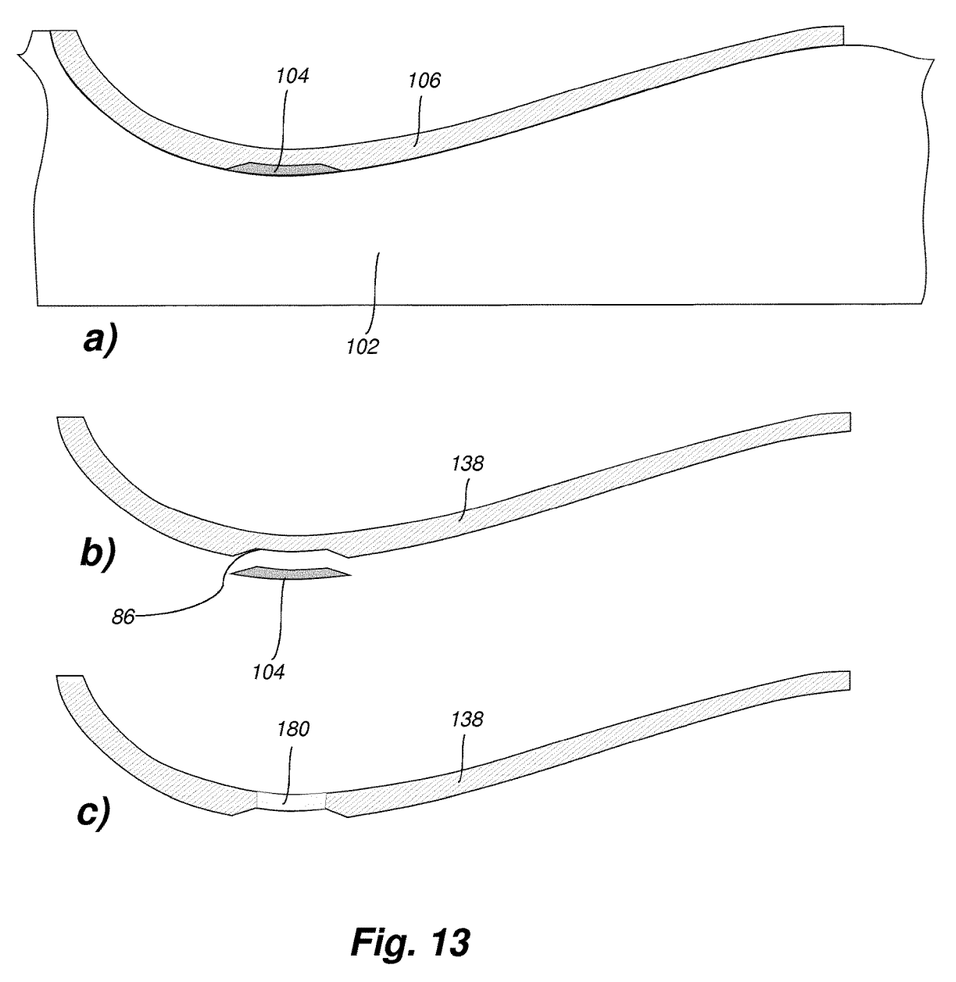
FIG. 13 illustrates a method of manufacturing an access arrangement according to the present invention.

FIG. 13 illustrates different steps of a method of manufacturing an access arrangement according to the present invention. FIG. 13*a* shows a mould 102 in which an implant 104 is arranged, on top of which a fibre material 106 is placed. The fibre material 106 is infused with a resin and the resin is cured to produce a hardened blade shell part 138. As shown in FIG. 13*b*, the implant 104 is removed from the hardened blade shell part 138 to expose an indentation 86 on the surface of the shell part 138 at the location of the implant. A hole is drilled or cut through the shell part at the location of the indentation 86 to produce an access opening 180 as shown in FIG. 13*c*.

The invention is not limited to the embodiments described herein and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38, 138 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 spar structure
64 first part
65 end surface of first part
66 second part
67 spar member
68, 168 first blade segment
69 cutting plane
70, 170 second blade segment
72 jacket/mesh
74, 174 locking pin
76 aperture
78 aperture
80, 180 access opening
82 shear web
84 pad eye
86 indentation
88 holes
90 access arrangement
92 cover panel
94 outer surface of cover panel
96 sealing member
98 fasteners
100 chamfered edge
102 blade mould
104 implant
106 fibre material
110 outer shell surface
L length
r distance from hub
R rotor radius

The invention claimed is:

1. A wind turbine blade having a profiled contour including a pressure side and a suction side, and a leading edge and a trailing edge with a chord having a chord length extending therebetween, the wind turbine blade extending in a spanwise direction between a root end and a tip end, wherein the wind turbine blade comprises a shell body with at least one pressure side shell member and at least one suction side shell member, and wherein the wind turbine blade comprises:
a spar structure (62) comprising a first part (64) and a second part (66), the first and second parts (64, 66) being releasably coupled to each other; and
an access arrangement (90) for accessing the spar structure (62) in a hollow space within the wind turbine blade, the hollow space being at least in part defined by a blade shell member (168), the access arrangement (90) comprising:
an access opening (180) provided in the blade shell member (168);
a cover panel (92) for covering the access opening (180);
a sealing member (96) arranged between the cover panel (92) and the blade shell member (168); and
one or more fasteners (98) for releasably fastening the cover panel (92) to the blade shell member (168),
wherein each of the one or more fasteners (98) of the access arrangement (90) is releasably inserted in a respective one of aligned holes (88) provided in the cover panel (92), the sealing member (96) and the blade shell member (168),
wherein the aligned holes (88) provided in the cover panel (92) are arranged annularly along an outer circumference of the cover panel (92), and
wherein the aligned holes (88) provided in the cover panel (92), the sealing member (96) and the blade shell member (168) are arranged such that the cover panel (92) can be releasably fastened to the blade shell member (168) in a single spatial orientation only.

2. The wind turbine blade according to claim 1, wherein the access arrangement (90) further comprises a retaining member connecting the cover panel (92) and the blade shell member independently of the one or more fasteners (98).

3. The wind turbine blade according to claim 1, wherein the one or more fasteners (98) of the access arrangement (90) comprise one or more blind rivets.

4. The wind turbine blade according to claim 1, wherein the one or more fasteners (98) of the access arrangement (90) comprise a dielectric material.

5. The wind turbine blade according to claim 1, wherein the blade shell member has an outer surface, the outer surface of the blade shell member comprising an annular indentation (86) surrounding the access opening (180) for receiving the sealing member (96).

6. The wind turbine blade according to claim 1, wherein the aligned holes (88) provided in the blade shell member (168) are arranged annularly along an annular indentation (86) of an outer surface of the blade shell member (168), the aligned holes (88) surrounding the access opening (180).

7. The wind turbine blade according to claim 1, wherein the sealing member (96) of the access arrangement (90) is an annular gasket.

8. The wind turbine blade according to claim 1, wherein the access opening (180) of the access arrangement (90) covers an area of not more than 0.25 m².

9. The wind turbine blade according to claim 1, wherein the spar structure (62) comprises at least one locking pin (74) for releasably coupling the first part (64) to the second part (66) of the spar structure (62) through aligned respective locking apertures in each of the first and second parts (64, 66) of the spar structure (62).

10. A method of manufacturing an access arrangement (90) according to claim 1, comprising the steps of:
- arranging an implant in a mould for moulding a wind turbine blade shell part;
- arranging a fibre material on said mould and the implant;
- infusing the fibre material and implant with a resin;
- curing the resin to produce a hardened blade shell part;
- removing the implant from the hardened blade shell part to expose an indentation (86) on the surface of the shell part at the location of the implant; and
- drilling or cutting a hole through the shell part at the location of the indentation (86) to produce an access opening (180).

11. A method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising the steps of:
- a1) manufacturing a pressure side shell half and a suction side shell half over substantially the entire length of the wind turbine blade;
- b1) arranging a spar structure (62) within one of the shell halves, the spar structure (62) comprising a first part (64) and a second part (66), the first and second part (66) being releasably coupled to each other;
- c1) closing and joining the shell halves for obtaining a closed shell;
- d1) cutting the closed shell along a cutting plane (69) substantially normal to the spanwise direction of the closed shell to obtain a first and a second blade segment (70), each blade segment comprising part of the pressure side shell half and part of the suction side shell half, wherein the spar structure (62) extends across the cutting plane (69);
- e1) uncoupling the first and second part (66) of the spar structure (62);
- f1) separating the first blade segment (68) from the second blade segment (70); and
- g1) joining and sealing the first blade segment (68) to the second blade segment (70) for obtaining the wind turbine blade,
- wherein the spar structure (62) comprises at least one locking pin (74) for releasably coupling the first part (64) to the second part (66) of the spar structure (62) through aligned respective locking apertures in each of the first and second part (66) of the spar structure (62), and wherein the wind turbine blade comprises an access arrangement (90) according to claim 1.

12. The method according to claim 11, wherein step e1) comprises withdrawing the locking pin (74) from the aligned respective apertures in each of the first and second part (66) of the spar structure (62) via the access arrangement (90).

13. The method according claim 11, wherein the method further comprises a step f2) or h1) of re-inserting the locking pin (74) into the aligned respective apertures in each of the first and second part (66) of the spar structure (62) via the access arrangement (90).

14. A wind turbine blade obtainable by the method according to claim 11.

* * * * *